United States Patent
Fujiwara (10) Patent No.: US 12,315,043 B2
(45) Date of Patent: May 27, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Chika Fujiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 18/045,081

(22) Filed: Oct. 7, 2022

(65) Prior Publication Data

US 2023/0124055 A1 Apr. 20, 2023

(30) Foreign Application Priority Data

Oct. 12, 2021 (JP) ................. 2021-167716

(51) Int. Cl.
*G06T 11/00* (2006.01)
(52) U.S. Cl.
CPC .................. *G06T 11/001* (2013.01)
(58) Field of Classification Search
CPC ...................................................... G06T 11/001
See application file for complete search history.

(56) References Cited

U.S. PATENT DOCUMENTS

| 9,979,894 B1* | 5/2018 | Kokemohr | H04N 13/207 |
| 2006/0033733 A1* | 2/2006 | Urisaka | G06T 17/00 |
| | | | 345/419 |
| 2007/0217682 A1* | 9/2007 | Motomura | G06V 10/60 |
| | | | 382/190 |
| 2019/0080509 A1* | 3/2019 | Bianco | G06T 15/506 |
| 2020/0134791 A1* | 4/2020 | Berlin | G06V 10/25 |
| 2021/0097757 A1* | 4/2021 | Yeung | G06T 15/005 |

FOREIGN PATENT DOCUMENTS

JP 2007018173 A 1/2007

* cited by examiner

*Primary Examiner* — Phi Hoang
(74) *Attorney, Agent, or Firm* — Canon U.S.A., Inc. IP Division

(57) ABSTRACT

An information processing apparatus includes a switching unit configured to perform switching from a first mode for a display of a first image that is a still image of an object, to a second mode for a display of a second image of the object, the second image being generated based on line-of-sight information, and a display control unit configured to display, on a display unit, the second image in which virtual illumination is reflected on the object, according to the switching performed by the switching unit.

11 Claims, 7 Drawing Sheets

INFORMATION PROCESSING APPARATUS, INFORMATION PROCESSING METHOD, AND STORAGE MEDIUM

BACKGROUND

Field

The present disclosure relates to a technique in a setting of illumination conditions for checking of a texture appearance of an object.

Description of the Related Art

In recent years, along with improvement in print and computer graphics (CG) techniques, accuracy in reproduction of texture appearances of objects has been highly improved. The texture appearance refers to an impression of a surface of an object, which is caused by asperities, a gloss, or the like, on the surface. Since a texture appearance of an object is perceived on the basis of reflections of radiated light on the object, to express the texture appearance of the object, it is important how illumination conditions are set. Japanese Patent Application Laid-Open No. 2007-18173 discusses a technique to control a virtual light source in a virtual space and reflections of surrounding environments on a virtual object, to realize optical consistency between a real space and the virtual space.

However, according to Japanese Patent Application Laid-Open No. 2007-18173, in a case where there are no reflections of illumination on an object, a gloss and shades based on asperities on a surface of the object are not expressed. This can give rise to an issue that the user has difficulty in checking a texture appearance of the object.

SUMMARY

Various embodiments of the present disclosure address the above-described issue and are directed to providing a process with which a texture appearance of an object can be easily checked.

According to one embodiment of the present disclosure, an information processing apparatus includes a switching unit configured to perform switching from a first mode for a display of a first image that is a still image of an object, to a second mode for a display of a second image of the object, the second image being generated based on line-of-sight information, and a display control unit configured to display, on a display unit, the second image in which virtual illumination is reflected on the object, according to the switching performed by the switching unit.

Further features of the present disclosure will become apparent from the following description of example embodiments with reference to the attached drawings.

DESCRIPTION OF THE EMBODIMENTS

Hereinafter, example embodiments will be described with reference to the drawings. The following example embodiments are not intended to limit the present invention. In addition, all of the combinations of features described in relation to the example embodiments are not necessarily essential to the solution of all embodiments of the present invention.

In a first example embodiment, virtual illumination is reflected on an object at the time when a first view mode for a display of a still image of the object is switched to a second view mode for a display of an image of the object generated based on line-of-sight information.

<Hardware Configuration of Information Processing Apparatus>

Figure 1:
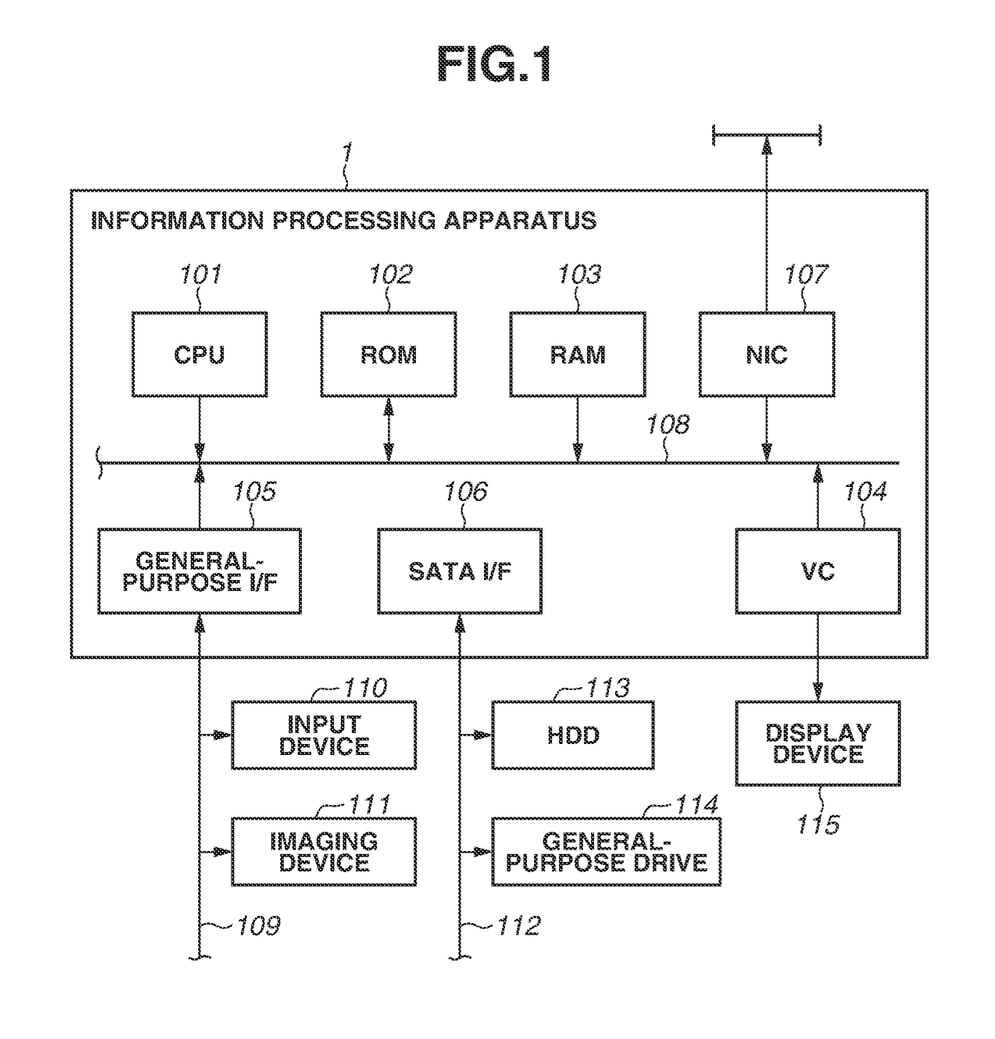
FIG. 1 is a block diagram illustrating a hardware configuration of an information processing apparatus according to one embodiment.

FIG. 1 is a block diagram illustrating a hardware configuration of an information processing apparatus 1. The information processing apparatus 1 includes a central processing unit (CPU) 101, a read only memory (ROM) 102, and a random access memory (RAM) 103. The information processing apparatus 1 also includes a video card (VC) 104, a general-purpose interface (I/F) 105, a serial advanced technology attachment (SATA) I/F 106, and a network interface card (NIC) 107. The CPU 101 executes an operating system (OS) or various programs stored in the ROM 102, a hard disk drive (HDD) 113, and the like, using the RAM 103 as a work memory. The CPU 101 controls the components via a system bus 108. Processes in the flowcharts described below are executed by the CPU 101 loading program codes stored in the ROM 102, the HDD 113, and the like, in the RAM 103. The VC 104 is connected with a display device 115. The general-purpose I/F 105 is connected with an input device 110, such as a mouse or a keyboard, and an imaging device 111 via a serial bus 109. The SATA I/F 106 is connected to a general-purpose drive 114 that performs reading from and writing to the HDD 113 or various recording media via a serial bus 112. The NIC 107 inputs and outputs information to and from an external device. The CPU 101 uses the HDD 113 and various recording media mounted in the general-purpose drive 114 as storage destinations of various types of data. The CPU 101 displays a user interface (UI) provided by a program on the display device 115 and receives an input of a user instruction via the input device 110. The display device 115 can be a touch panel display having a function of a touch panel that detects a touch position of an indicator, such as a finger.

<Logical Configuration of Information Processing Apparatus>

Figure 2:
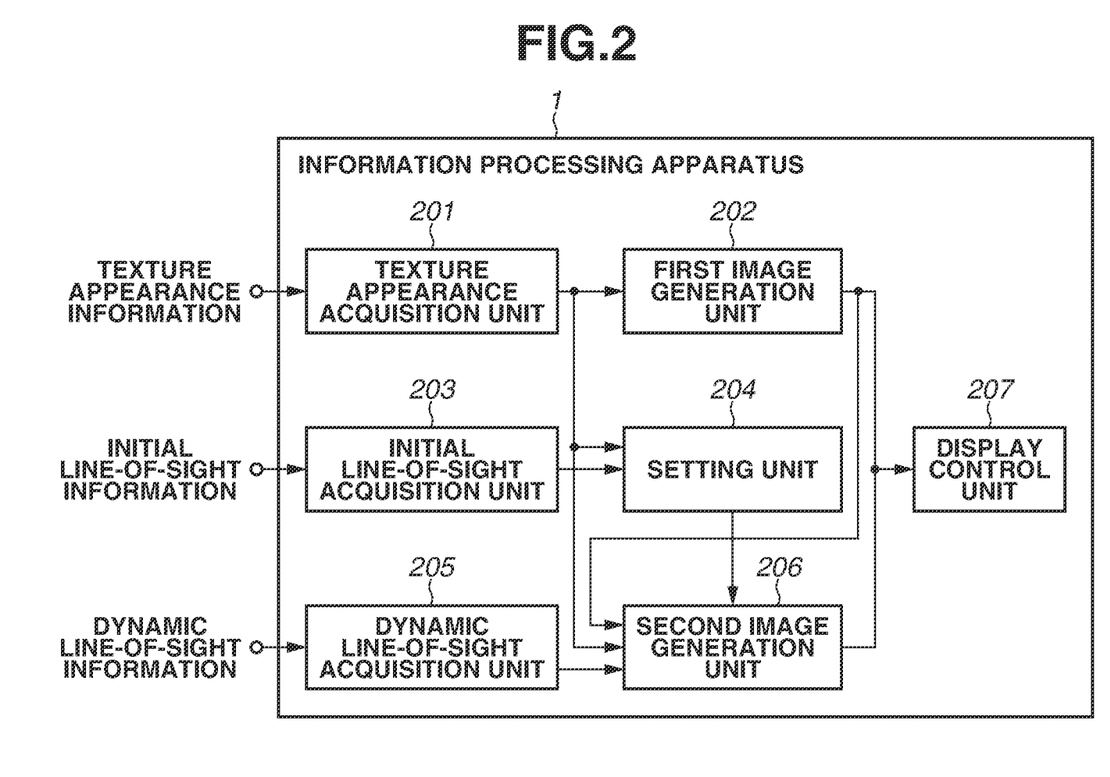
FIG. 2 is a block diagram illustrating a logical configuration of the information processing apparatus according to one embodiment.

FIG. 2 is a block diagram illustrating a logical configuration of the information processing apparatus 1. The CPU 101 functions as logical components illustrated in FIG. 2 by reading and executing programs from the ROM 102 or the HDD 113, using the RAM 103 as a work memory. All the processes described below are not necessarily executed by the CPU 101. The information processing apparatus 1 can be configured such that some or all of the processes are performed by one or more processing circuits other than the CPU 101.

The information processing apparatus 1 includes a texture appearance acquisition unit 201, a first image generation unit 202, an initial line-of-sight acquisition unit 203, a setting unit 204, a dynamic line-of-sight acquisition unit 205, a second image generation unit 206, and a display control unit 207. The texture appearance acquisition unit 201 acquires, as texture appearance information, diffuse reflection intensity $\rho_d(x, y)$, specular reflection intensity $\rho_s(x, y)$, glossiness $\sigma(x, y)$, and a normal N(x, y). The first image generation unit 202 generates first image data on a first image $I_1(x, y)$ to be displayed in the first view mode, based on the diffuse reflection intensity $\rho_d(x, y)$ acquired by the texture appearance acquisition unit 201. The initial line-of-sight acquisition unit 203 acquires line-of-sight information at the time of when the first view mode is switched to the second view mode. The setting unit 204 sets illumination orientation L and illumination intensity E as illumination information, based on the line-of-sight information and the texture appearance information. The dynamic line-of-sight acquisition unit 205 acquires line-of-sight information dynamically changed in the second view mode. The second image generation unit 206 uses the line-of-sight information, the illumination information, the first image data, and the texture appearance information to generate second image data on a second image $I_2(x, y)$ to be displayed in the second view mode. The display control unit 207 controls the display device 115 to display the first image $I_1(x, y)$, the second image $I_2(x, y)$, and the like, on the display device 115.

<Process Executed by the Information Processing Apparatus 1>

Figure 3:
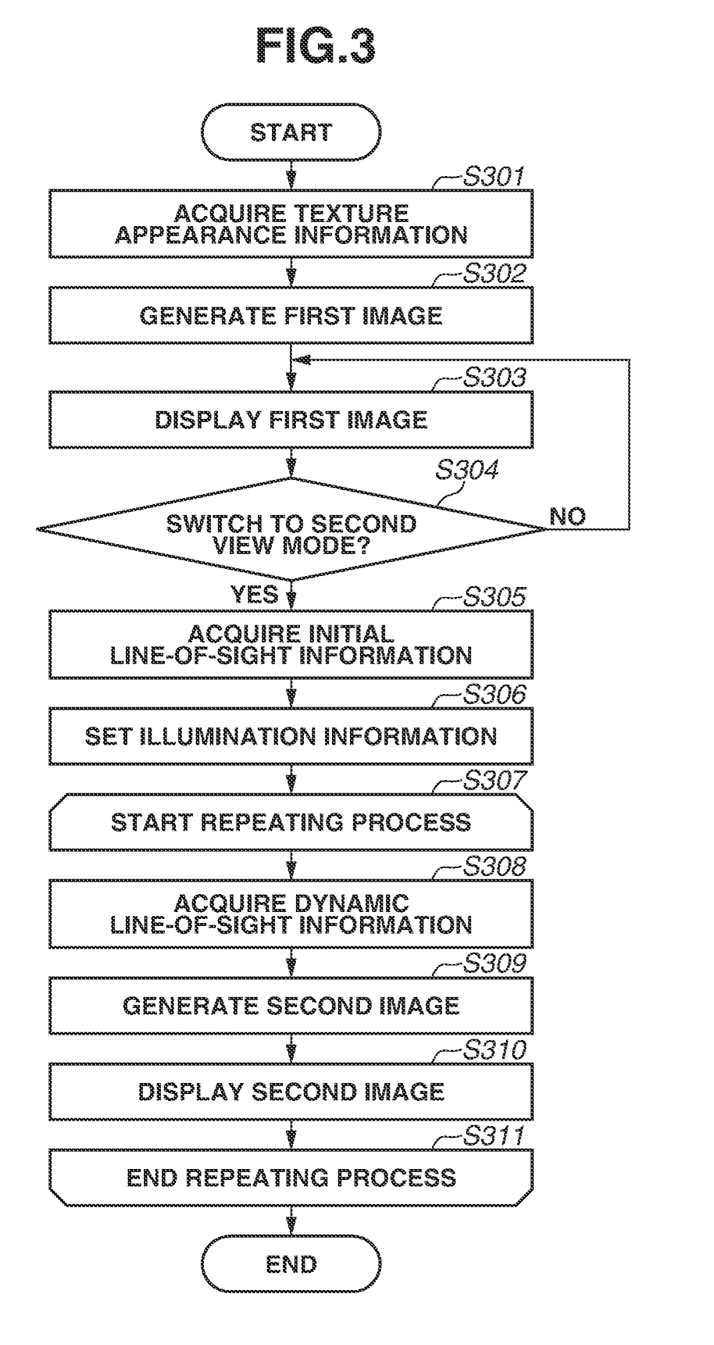
FIG. 3 is a flowchart of a process that is executed by the information processing apparatus according to one embodiment.

A procedure of a process that is executed by the information processing apparatus 1 in the present example embodiment will be described with reference to the flowchart illustrated in FIG. 3. The process illustrated in the flowchart of FIG. 3 is started when the user issues an instruction via the input device 110 and the CPU 101 receives the input instruction.

Figure 4:
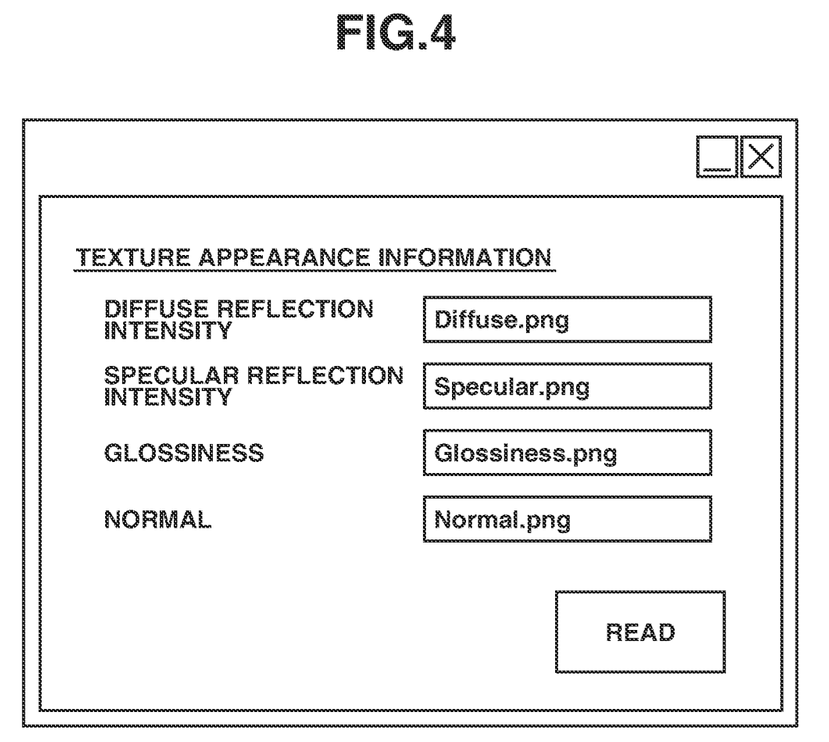
FIG. 4 is a diagram illustrating a user interface (UI) for acquisition of texture appearance information according to one embodiment.

In S301, the texture appearance acquisition unit 201 acquires the diffuse reflection intensity $\rho_d(x, y)$, the specular reflection intensity $\rho_s(x, y)$, the glossiness $\sigma(x, y)$, and the normal N(x, y) from storages indicated in the texture appearance information, in accordance with the instruction received from the user via the input device 110. FIG. 4 is a diagram illustrating an example of a UI for acquisition of the texture appearance information. The texture appearance acquisition unit 201 sets a storage of the texture appearance information specified by the user for each of the diffuse reflection intensity $\rho_d(x, y)$, the specular reflection intensity $\rho_s(x, y)$, the glossiness $\sigma(x, y)$, and the normal N(x, y). In response to a pressing operation performed on a read button, the texture appearance acquisition unit 201 acquires the diffuse reflection intensity $\rho_d(x, y)$, the specular reflection intensity $\rho_s(x, y)$, the glossiness $\sigma(x, y)$, and the normal N(x, y) from the respective storages. In the present example embodiment, the texture appearance information is stored in the HDD 113. However, the texture appearance information can be stored in another device connected to the information processing apparatus 1, or the information processing apparatus 1 can have a storage unit. The diffuse reflection intensity $\rho_d(x, y)$ and the specular reflection intensity $\rho_s(x, y)$ in the present example embodiment are read in the form of a color image with pixel values (R, G, and B) represented by 8 bits. The intensities represented by values of 0 to 1 are associated with values of 0 to 255. The glossiness $\sigma(x, y)$ in the present example embodiment is read in the form of a gray scale image with pixel values represented by 8 bits. As a value of the glossiness is greater, the spread of specular reflection becomes narrower, and consequently, a high-gloss appearance can be expressed. The normal N(x, y) in the present example embodiment is read in the form of a color image with pixel values (R, G, and B) represented by 8 bits. The x components of the normal (values of −1 to 1) are associated with the R components of the pixel values (values of 0 to 255). The y components of the normal (values of −1 to 1) are associated with the G components of the pixel values (values of 0 to 255). The z components of the normal (values of −1 to 1) are associated with the B components of the pixel values (values of 0 to 255).

In step S302, the first image generation unit 202 generates the first image data on the first image $I_1(x, y)$ that is displayed in the first view mode, based on the texture appearance information acquired in step S301. The first image $I_1(x, y)$ is a still image of an object that is displayed in the first view mode, and is generated by the following equation (1) using the diffuse reflection intensity $\rho_d(x, y)$:

$$I_1(x,y)=E_d\rho_d(x,y) \quad (1).$$

In the above equation, $E_d$ is intensity of illumination that is set such that the maximum value of the first image $I_1(x, y)$ is 50% of the maximum pixel value (255), for example, in order to make the first image visible.

Figure 5:
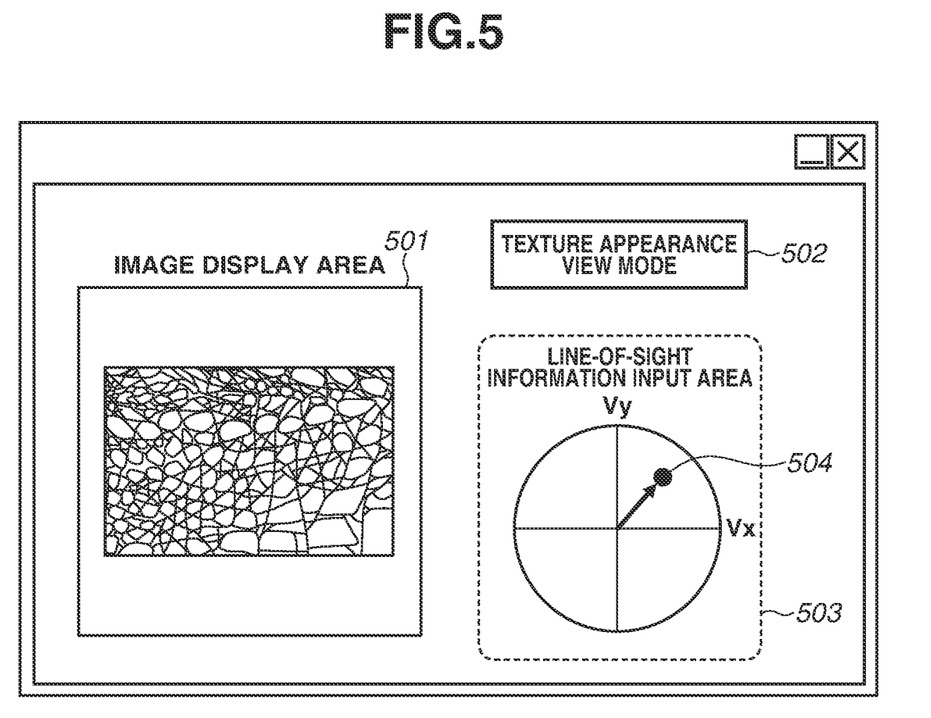
FIG. 5 is a diagram illustrating an UI that displays an image according to one embodiment.

In step S303, the display control unit 207 displays, on the display device 115, the first image $I_1(x, y)$ represented by the first image data generated in step S302. FIG. 5 illustrates an example of a UI for a display of an image. The display control unit 207 displays the first image $I_1(x, y)$ in an image display area 501. In step S304, the display control unit 207 determines whether an instruction to switch from the first view mode to the second view mode is received via the UI. The display control unit 207 continues to display the first image $I_1(x, y)$ in step S303 until the switching instruction is issued from the user. In response to receipt of the switching instruction from the user, the display control unit 207 determines that the switching instruction is received (YES in step S304), the processing proceeds to step S305. The switching instruction is input by the user pressing a texture appearance view mode button 502 in the UI illustrated in FIG. 5, for example. In a case where the display control unit 207 determines that the switching instruction is not received (NO in step S304), the processing returns to step S303.

In step S305, the initial line-of-sight acquisition unit 203 acquires initial line-of-sight information at the time of when the mode switching instruction is received in step S304. The line-of-sight information is a line-of-sight vector V=(Vx, Vy, and Vz) indicating a direction of the line of sight. The line-of-sight vector is input using a line-of-sight information input area 503 in the UI illustrated in FIG. 5, for example. Specifically, Vx and Vy of the line-of-sight vector V (values of −1 to 1 which satisfy Vx$^2$+Vy$^2$<1) are specified by a pointer 504. The initial line-of-sight acquisition unit 203 derives Vz by using the following equation (2):

$$V_z = \sqrt{1 - V_x^2 - V_y^2}. \quad (2)$$

In step S306, the setting unit 204 sets illumination information, based on the line-of-sight vector V, which is the line-of-sight information acquired in step S305, and the texture appearance information acquired in step S301.

The illumination information contains illumination vector L=(Lx, Ly, Lz) indicating a direction of illumination and illumination intensity E, which are set such that the user can check desired image features. In the present example embodiment, determination of whether desired image features can be checked is made using the number of pixels of which pixel values are saturated. First, the setting unit 204 sets the illumination vector L such that the illumination vector L forms a specular reflection relationship with the line-of-sight vector V, using the normal indicating an average orientation of the object. Specifically, the setting unit 204 derives the illumination vector L using the following equation (3):

$$L=2\text{dot}(N',V)N'-V \qquad (3).$$

In the above equation, N' is an average vector of the normal N(x, y) that is obtained by averaging the x, y, z components of the normal and normalizing the average such that the length becomes 1. In the above equation, dot(·,·) represents the calculation of inner product of the vectors.

Next, the setting unit 204 sets the illumination intensity E. The setting unit 204 sets the illumination intensity E, based on the number of pixels of which pixel values are saturated in the image generated using the illumination vector L, the line-of-sight vector V, the diffuse reflection intensity $\rho_d(x, y)$, the specular reflection intensity $\rho_s(x, y)$, the normal N(x, y), and the glossiness σ(x, y). First, the setting unit 204 generates an image I(x, y) using the following equation (4) based on an equation in accordance with the Lambert's cosine law corresponding to diffuse reflection and a Blinn-Phong model corresponding to specular reflection:

$$I(x,y)=E(\rho_d(x,y)\text{dot}'(N(x,y),L)+\rho_s(x,y)(\text{dot}'(N(x,y),H))^{\sigma(x,y)}) \qquad (4).$$

In the above equation, dot' (·,·) represents the calculation of inner product of the vectors. If the inner product is negative, the negative value is replaced with zero. In the above equation, H is an intermediate vector (half vector) between the illumination vector L and the line-of-sight vector V and is derived by the expression H=(L+V)/|L+V|. The setting unit 204 calculates the image I(x, y) with each increase in the illumination intensity E in the equation (4), and sets the illumination intensity E with which the number of pixels of which pixel values are saturated exceeds a threshold. The threshold for the number of pixels of which pixel values are saturated is preset to 1% of all the pixels.

In step S307, the second image generation unit 206 starts a repeating process of steps S308 to S310. In response to the user issuing an end instruction of the repeating process, the repeating process is ended in step S311. In step S308, the dynamic line-of-sight acquisition unit 205 acquires the line-of-sight vector V=(Vx, Vy, and Vz) as line-of-sight information to be dynamically input in the second view mode. The line-of-sight vector V is acquired based on Vx and Vy that are specified by the pointer 504 on the line-of-sight information input area 503 in the UI illustrated in FIG. 5 and Vz that is derived by the equation (2).

In step S309, the second image generation unit 206 generates the second image data indicating the second image $I_2(x, y)$ by using the illumination vector L, the illumination intensity E, the line-of-sight vector V, the first image $I_1(x, y)$, the diffuse reflection intensity $\rho_d(x, y)$, the specular reflection intensity $\rho_s(x, y)$, the normal N(x, y), and the glossiness σ(x, y). Specifically, the second image generation unit 206 generates the second image $I_2(x, y)$ by superimposing, on the first image $I_1(x, y)$, an image I' (x, y) that is generated using the texture appearance information, the illumination information, and the line-of-sight information. The second image generation unit 206 performs the superimposition of the image I' (x, y) on the first image $I_1(x, y)$ by using the following equations (5) and (6):

$$I_2(x,y)=\beta I_1(x,y)+(1-\beta)I'(x,y) \qquad (5), \text{ and}$$

$$I'(x,y)=E(\rho_d(x,y)\text{dot}'(N(x,y),L)+\rho_s(x,y)(\text{dot}'(N(x,y),H))^{\sigma(x,y)}) \qquad (6).$$

In the above equation, β is the composition ratio of the first image $I_1(x, y)$ and the image I' (x, y), and is set to β=0.5, for example.

In step S310, the display control unit 207 displays the second image $I_2(x, y)$ generated in step S309 on the display device 115. Specifically, the display control unit 207 displays the second image $I_2(x, y)$ in the image display area 501 on the UI illustrated in FIG. 5.

As described above, the information processing apparatus 1 according to the present example embodiment reflects virtual illumination on the image displayed at the time of when the first view mode for a display of a still image of an object is switched to the second view mode for a display of an image of the object generated based on the line-of-sight information. Thus, after the switching to the second view mode to check the texture appearance of the object, the user can easily check the texture appearance of the object, such as asperities and gloss, by observing the illumination reflected on the object.

In the first example embodiment, the first image that is displayed in the first view mode is generated based on the texture appearance information. Alternatively, a still image that is displayed as the first image can be prepared separately. In a second example embodiment, a pre-generated image is acquired as a first image that is displayed in a first view mode, and a second image that is displayed in a second view mode is generated based on texture appearance information. A hardware configuration of an information processing apparatus in the present example embodiment is equal to the configuration in the first example embodiment, and thus the redundant description will be omitted. Hereinafter, differences of the present example embodiment from the first example embodiment will be mainly described. Components of the present example embodiment identical to the components of the first example embodiment will be described using identical reference signs.

<Logical Configuration of Information Processing Apparatus 1>

Figure 6:
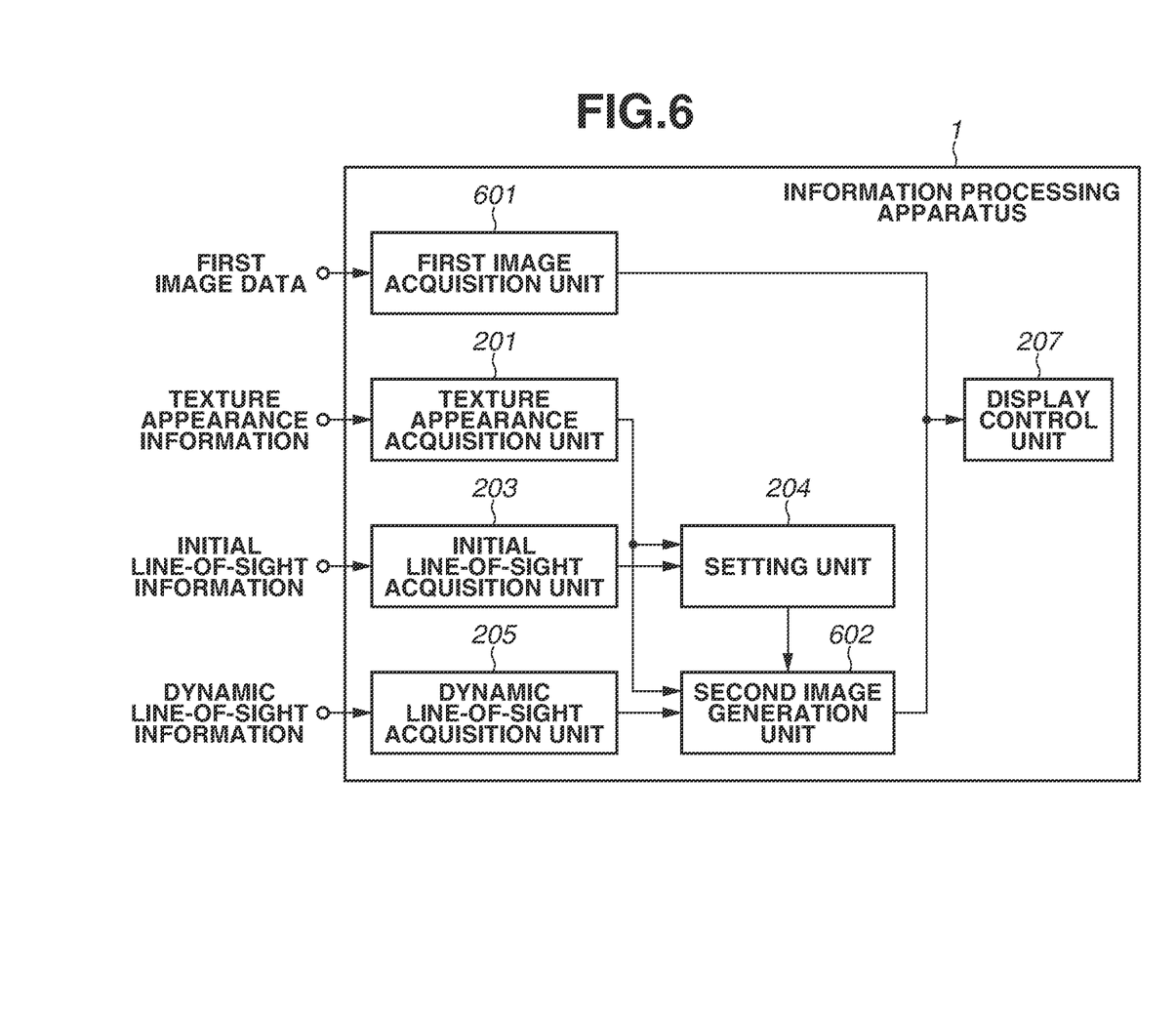
FIG. 6 is a block diagram illustrating a logical configuration of an information processing apparatus according to one embodiment.

FIG. 6 is a block diagram illustrating a logical configuration of an information processing apparatus 1. The CPU 101 functions as logical components illustrated in FIG. 6 by reading and executing programs stored in the ROM 102 or the HDD 113, using the RAM 103 as a work memory. All of the processes described below are not necessarily executed by the CPU 101. The information processing apparatus 1 may be configured to perform some or all of the processes by one or more processing circuits.

The information processing apparatus 1 includes a first image acquisition unit 601, a texture appearance acquisition unit 201, an initial line-of-sight acquisition unit 203, a setting unit 204, a dynamic line-of-sight acquisition unit 205, a second image generation unit 602, and a display control unit 207. The first image acquisition unit 601 acquires first image data on a first image $I_1(x, y)$ that is displayed in a first view mode. The second image generation unit 602 generates second image data on a second image $I_2(x, y)$ that is displayed in a second view mode, using line-of-sight information, illumination information, and texture appearance information.

<Process Executed by Information Processing Apparatus 1>

Figure 7:
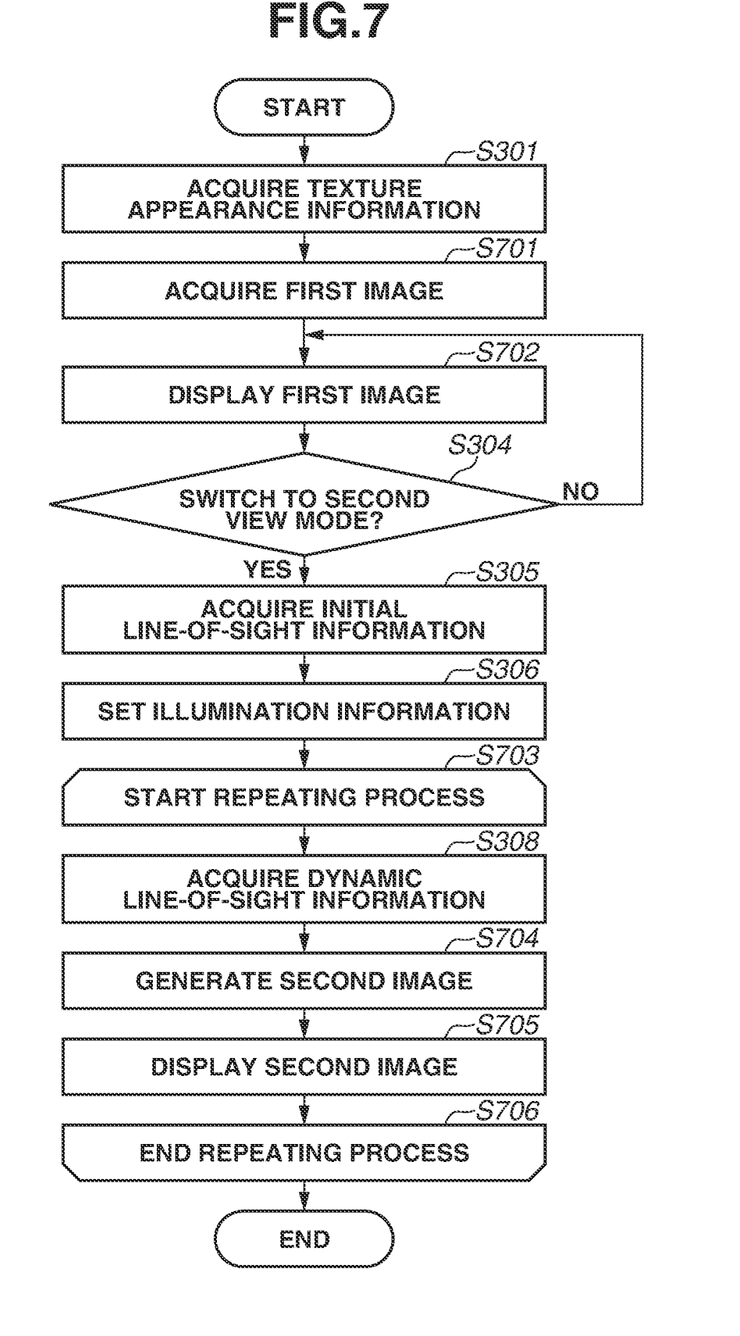
FIG. 7 is a flowchart of a process that is executed by the information processing apparatus according to one embodiment.

A procedure of a process executed by the information processing apparatus 1 in the present example embodiment will be described with reference to the flowchart of FIG. 7. The process illustrated in the flowchart of FIG. 7 is started when the user inputs an instruction via an input device 110 and the CPU 101 receives the input instruction.

Step S301 is a step similar to the corresponding step in the first example embodiment and thus the redundant description will be omitted. In step S701, the first image acquisition unit 601 acquires the first image data on the first image $I_1(x, y)$ from the data storage, in response to the user issuing the instruction. The first image $I_1(x, y)$ is a color image with pixel values (R, G, and B) represented by 8 bits. The first image acquisition unit 601 displays an UI similar to the UI illustrated in FIG. 4, sets a storage of the first image data, and acquires the first image data from the storage in response to a pressing operation performed on the read button.

In step S702, the display control unit 207 displays the first image $I_1(x, y)$ represented by the first image data acquired in step S701 on the display device 115. The UI displayed is similar to the UI illustrated in FIG. 5, and the display control unit 207 displays the first image $I_1(x, y)$ in an image display area 501. Steps S304, S305, and S306 are similar to the corresponding steps in the first example embodiment, and the redundant description will be omitted. In step S703, the second image generation unit 602 starts a repeating process of steps S308, S704, and S705. In response to an end instruction of the repeating process issued from the user, in step S706, the repeating process is ended. Step S308 is similar to the corresponding step in the first example embodiment, and thus the redundant description will be omitted.

In step S704, the second image generation unit 602 generates second image data on the second image $I_2(x, y)$, using line-of-sight vector V, illumination vector L, illumination intensity E, diffuse reflection intensity $\rho_d(x, y)$, specular reflection intensity $\rho_s(x, y)$, normal $N(x, y)$, and glossiness $\sigma(x, y)$. Specifically, the second image generation unit 602 generates the second image $I_2(x, y)$ by using the following equation (7):

$$I_2(x,y)=E(\rho_d(x,y)\text{dot}'(N(x,y),L)+\rho_s(x,y)(\text{dot}'(N(x,y),H))^{\sigma(x,y)}) \quad (7).$$

In step S705, the display control unit 207 displays the second image $I_2(x, y)$ generated in step S704 on the display device 115. Specifically, the display control unit 207 displays the second image $I_2(x, y)$ in the image display area 501 on the UI illustrated in FIG. 5.

<Effect of Present Example Embodiment>

As described above, the information processing apparatus 1 in the present example embodiment acquires an image generated in advance as the first image that is displayed in the first view mode, and displays the first image until the first view mode is switched to the second view mode. Since the user can specify the image that is displayed in the first view mode, the image that is presented to the user in the first view mode can be set to an image desirable for the user.

Modification Examples

In the above-described example embodiments, UIs and images are displayed on the display device 115 externally connected to the information processing apparatus 1. Alternatively, UIs and images can be displayed on a hardware configuration, such as a tablet in which an information processing apparatus and a display unit are integrated.

In the above-described example embodiments, the initial line-of-sight information at the time of the switching to the second view mode and the line-of-sight information that is used when the second image is generated are input via the UIs. In a case of using a hardware configuration, such as a tablet, as the information processing apparatus 1, the line-of-sight information can be acquired using a gyro sensor or an in-camera.

In the first example embodiment, the maximum value of the illumination intensity of when the first image is generated is set such that the maximum value of $I_1(x, y)$ becomes 50% of the maximum pixel value (255). However, the percentage can be set to a different percentage.

In the first example embodiment, the first image is generated by multiplying the diffuse reflection intensity by a constant number. Alternatively, the first image can be acquired by a calculation based on a Lambert model using the normal.

In the above-described example embodiments, the normal indicating the orientation of the surface of an object is acquired as shape information of the object contained in the texture appearance information. Alternatively, a height map indicating height distribution of the object can be acquired. In such a case, the height map is converted into a normal map by differentiation and then the above-described process is performed.

In the above-described example embodiments, as the texture appearance information, the diffuse reflection intensity, the specular reflection intensity, the glossiness, and the normal are acquired. Alternatively, other information can also be acquired based on a texture appearance to be expressed, such as an anisotropic map indicating distribution directions of specular reflection.

In the above-described example embodiments, the texture appearance information is used in the format of an image with pixel values represented by 8 bits. Alternatively, a different image format (such as 16-bit image format) or information in a different format (binary file with a list of data, text data, or the like) can be used.

In the above-described example embodiments, a Blinn-Phong model is used as a model of specular reflection light in the generation of the second image. Alternatively, a different model form, such as a Torrance-Sparrow model or approximation using a Gauss function, can be used.

In the above-described example embodiments, the illumination information, which is used in the generation of the second image, is set based on the number of pixels of which pixel values are saturated. Alternatively, the illumination information can be set based on a preset ratio of specular reflection and diffuse reflection or a local contrast.

In the above-described example embodiments, the ratio of the composition with the first image in the generating of the second image is set to 0.5. Alternatively, a different ratio can be used.

In the above-described example embodiments, the number of saturated pixels, which is used in the setting of the illumination intensity, is set to 1% of all the pixels in the image. Alternatively, a different threshold can be set.

In the above-described example embodiments, the image that is displayed on the image display area 501 is updated when the line-of-sight information is newly acquired. Alternatively, a plurality of images each having different line-of-sight information can be displayed together.

Displaying the plurality of images allows the user to compare the plurality of images and the user can easily check a difference in the appearances of the object by observing a change in the line-of-sight information.

According to the example embodiments of the present disclosure, it is possible to easily check a texture appearance of an object.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-167716, filed Oct. 12, 2021, which is hereby incorporated by reference herein in its entirety.

What is claimed is:

1. An information processing apparatus comprising:
one or more processors that are configured to perform operations comprising:
performing switching from a first mode for a display of a first image of an object, to a second mode for a display of a second image of the object;
setting, based on line of sight information to be used in generating an illumination effect on the object and the number of pixels of which pixel values are saturated, virtual illumination information for achieving the illumination effect on the object; and
displaying, on a display unit, the second image in which virtual illumination is reflected on the object, according to the switching,
wherein the second image is generated based on the virtual illumination information.

2. The information processing apparatus according to claim 1, wherein the second image is generated based on texture appearance information about a texture appearance of the object.

3. The information processing apparatus according to claim 2, wherein the operations further comprise:
acquiring the texture appearance information; and
generating the second image such that virtual illumination is reflected on the object, based on the texture appearance information and the illumination information.

4. The information processing apparatus according to claim 3, wherein the generating generates the second image by superimposing, on the first image, an image having reflections of the virtual illumination.

5. The information processing apparatus according to claim 2, wherein the operations further comprise:
setting the virtual illumination, based on the illumination information, the line-of-sight information and the texture appearance information.

6. The information processing apparatus according to claim 5, wherein the setting sets the virtual illumination information, based on a preset ratio of specular reflection and diffuse reflection.

7. The information processing apparatus according to claim 5, wherein the setting sets the virtual illumination information, based on a local contrast.

8. The information processing apparatus according to claim 2, wherein the texture appearance information includes at least diffuse reflection intensity, specular reflection intensity, and a normal.

9. The information processing apparatus according to claim 1, wherein the operations further comprise:
acquiring second line-of-sight information,
wherein, in response to the second line-of-sight information being newly acquired, the information processing apparatus displays, on the display unit, an image generated based on the newly acquired second line-of-sight information.

10. An information processing method comprising:
performing switching from a first mode for a display of a first image of an object, to a second mode for a display of a second image of the object;
setting, based on line of sight information to be used in generating an illumination effect on the object and the number of pixels of which pixel values are saturated, virtual illumination information for achieving the illumination effect on the object; and
displaying, on a display unit, the second image in which virtual illumination is reflected on the object, according to the switching,
wherein the second image is generated based on the virtual illumination information.

11. A non-transitory computer-readable storage medium storing instructions that, when executed by a computer, cause the computer to perform an information processing method, the information processing method comprising:
performing switching from a first mode for a display of a first image of an object, to a second mode for a display of a second image of the object;
setting, based on line of sight information to be used in generating an illumination effect on the object and the number of pixels of which pixel values are saturated, virtual illumination information for achieving the illumination effect on the object; and
displaying, on a display unit, the second image in which virtual illumination is reflected on the object, according to the switching, wherein the second image is generated based on the virtual illumination information.

\* \* \* \* \*